United States Patent [19]

Sottek

[11] Patent Number: 5,138,213
[45] Date of Patent: Aug. 11, 1992

[54] BRUSHLESS D.C. MOTOR

[75] Inventor: Roland Sottek, Roetgen, Fed. Rep. of Germany

[73] Assignee: U.S. Philips Corporation, New York, N.Y.

[21] Appl. No.: 626,655

[22] Filed: Dec. 13, 1990

[30] Foreign Application Priority Data

Dec. 13, 1989 [DE]  Fed. Rep. of Germany ....... 3941102

[51] Int. Cl.$^5$ .............................................. H02K 1/14
[52] U.S. Cl. .................................... 310/269; 310/156; 310/180; 310/185; 310/216
[58] Field of Search ............... 310/67 R, 156, 154, 310/269, 177, 46, 40 MM, 254, 261, 208, 179, 180, 198, 216, 184, 185

[56] References Cited

U.S. PATENT DOCUMENTS

| | | | |
|---|---|---|---|
| 3,860,843 | 1/1975 | Kawasaki | 310/156 |
| 4,467,233 | 8/1984 | Moren | 310/254 |
| 4,758,132 | 7/1988 | Hartwig | 310/67 R |
| 4,851,758 | 7/1989 | Osada | 310/184 |
| 4,883,999 | 11/1989 | Hendershot | 310/185 |
| 5,030,867 | 7/1991 | Yamada | 310/156 |

FOREIGN PATENT DOCUMENTS

| | | | |
|---|---|---|---|
| 7310863 | 4/1977 | Fed. Rep. of Germany . | |
| 0099910 | 8/1979 | Japan | 310/67 R |
| 0028852 | 2/1984 | Japan | 310/269 |
| 0152240 | 8/1985 | Japan . | |
| 0060494 | 2/1990 | Japan | 310/269 |

*Primary Examiner*—R. Skudy

[57] ABSTRACT

The invention relates to a brushless d.c. motor comprising a first motor section (1), which exhibits circumferentially alternating permanent-magnetic north and south poles adjacent the magnetic air gap (17), and comprising a second motor section (9) having electrically energizable salient soft-magnetic pole shanks (11) extending towards the magnetic air gap, the soft-magnetic pole shanks (11) extending with their iron cross-section, which traverses the exciter coils (15), up to the proximity of the magnetic air gap (17), the pole tips (19) of the pole shanks (11) being rounded to reduce the cross-section towards the air gap.

2 Claims, 1 Drawing Sheet

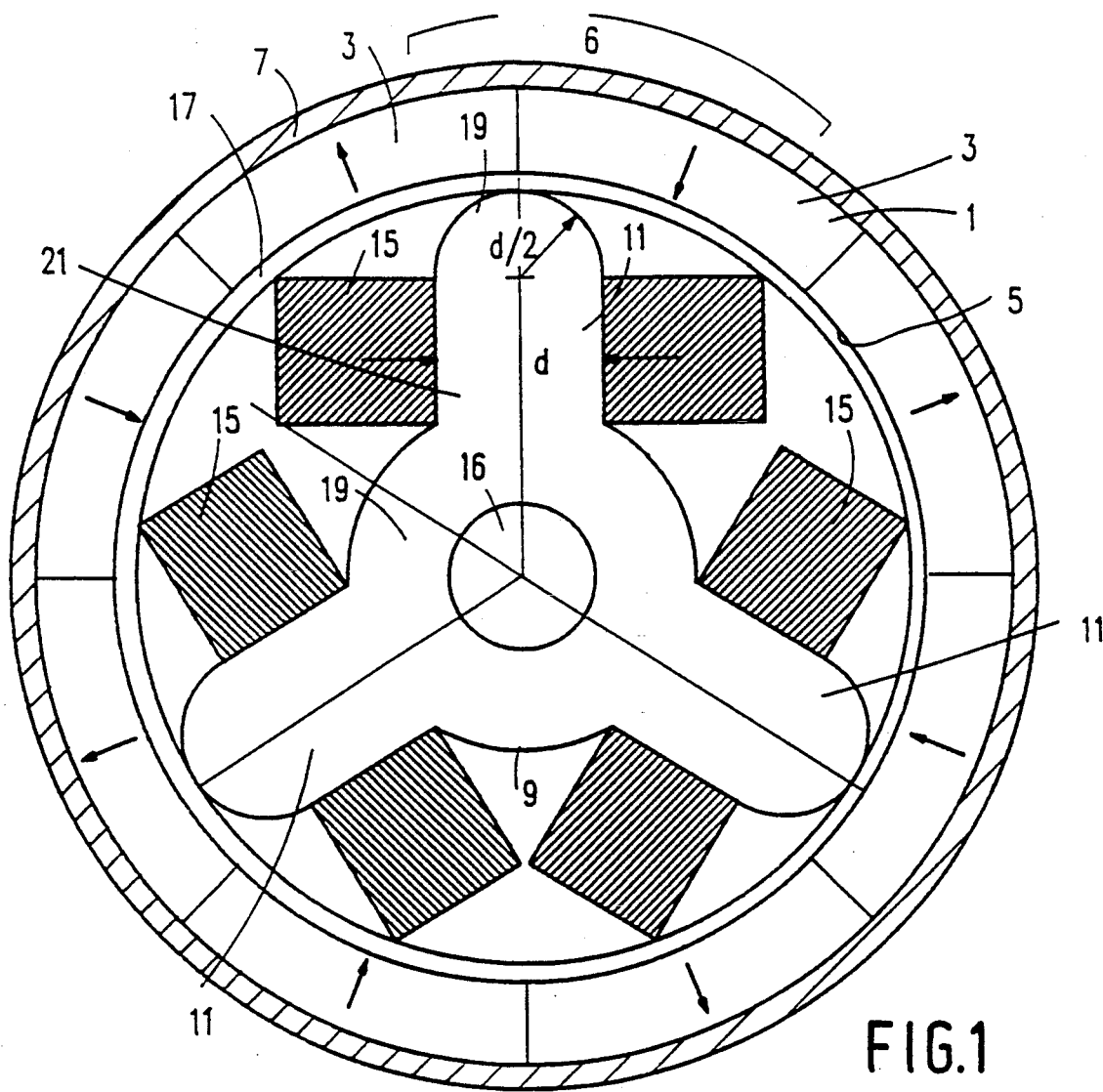
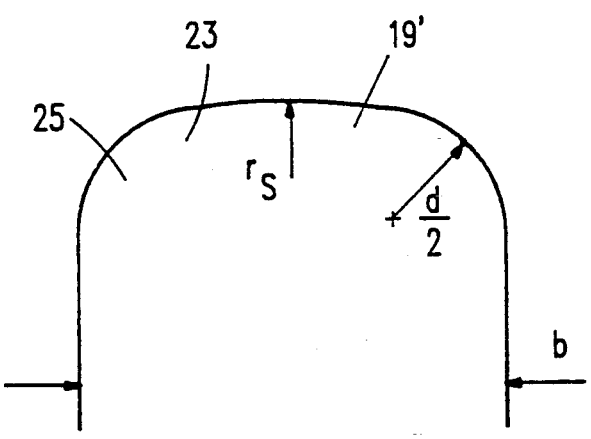
FIG.1
FIG.2

BRUSHLESS D.C. MOTOR

BACKGROUND OF THE INVENTION

1. Field of the Invention

The invention relates to a brushless d.c. motor comprising a first motor section, which exhibits circumferentially alternating permanent-magnetic north and south poles adjacent the magnetic air gap, and comprising a second motor section having electrically energizable salient soft-magnetic pole shanks extending towards the magnetic air gap.

2. Description of the Related Art

Motors of the type referred to above are known, for example from DE-U 73 10 863. A problem with such motors is that they exhibit a so-called detent torque. Such a detent torque leads to undesirable mechanical vibrations, noises and speed fluctuations. It is known that the fundamental frequency of the detent torque is given by the product of the mechanical rotational frequency of the motor and the least common multiple of the permanent-magnetic pole pairs of the permanent-magnetic motor section and the number of pole shanks of the electrically energized motor section.

From U.S. Pat. No. 3,860,843 it is known to reduce the detent torque of a brushless d.c. machine in that the pole shoes of the salient soft-magnetic poles of the electrically energized motor section have a more pronounced curvature relative to the air gap than the air gap itself. Conversely, JP-A 60-152240 discloses pole shoes with a pole arc which at the location of the air gap has substantially the same curvature as the air gap but which, in addition, has a salient portion in the pole arc center, which distinctly reduces the effect of the air gap. Another tooth geometry with teeth having salient pole shoes is disclosed in JP-A 60-249838.

In view of the detent torque the prior-art pole shoe geometries are very susceptible to manufacturing tolerances. Very small changes of the geometry already lead to a large change in detent torque. Usually the geometry of the pole shoe arcs is selected in such a way that in general only a Fourier component of the detent torque is reduced strongly. From this point of view the geometry is selected in such a way that the fundamental substantially disappears. However, it is inevitable that the upper harmonics, which in general still lie in a relevant frequency range, still have a significant amplitude.

SUMMARY OF THE INVENTION

It is an object of the invention to provide a brushless d.c. motor in which geometry deviations of the pole arcs of the soft-magnetic electrically excited pole pieces are less significant in view of the detent torque of the motor, so that the mass production of small brushless d.c. motors becomes less problematic.

According to the invention this object is achieved in that the soft-magnetic pole shanks extend with their iron cross-section, which traverses the exciter coils, up to the proximity of the magnetic air gap, the pole tips of the pole shanks being rounded to reduce the cross-section towards the air gap.

The absence of pole shoes and the rounding of the soft-magnetic poles themselves first of all reduces the detent torque. The geometry of the pole arc at the air gap is considerably less critical.

In a further embodiment of the invention, in the case of a pole iron width d at the location of the coils, the rounding has a radius d/2. In addition to a reduction of the detent torque such a total rounding with a radius d/2 also results in a very small fundamental and first harmonic of the detent torque. The width of the soft-magnetic pole then hardly contributes to this effect on the detent torque.

It is true that the flux linkage of the exciter field with the permanent-magnetic stator field yields a smaller value. However, in the case of small motors, as used in for example dry-shavers, such a smaller value is readily outweighed by the advantage of a better control of the detent torque.

In a further embodiment of the invention, in the case of a pole iron width b (b>d) at the location of the coils, the roundings in the central iron area are adapted to the arc radius of the air gap and have a smaller arc radius in the peripheral areas. Such an embodiment has the advantage that the flux linkage of the exciter field with the permanent-magnetic stator field exhibits a higher value and, in addition, that for a specific pole shank width b and a given effective air gap the pole tip geometry with the parameter d can be varied in such a way that the detent torque of the motor becomes small. This tooth shape is recommended in those cases in which the pole shank width is substantially larger than the required effective air gap.

BRIEF DESCRIPTION OF THE DRAWINGS

The invention will now be described in more detail, by way of example, with reference to the drawings. In the drawing FIG. 1 is a cross-sectional view showing a brushless d.c. motor in accordance with the invention, comprising a stationary soft-magnetic motor section and a hard-magnetic motor section capable of rotating around this stationary section, and FIG. 2 shows a modified shape of the end face of a tooth or pole situated in the air gap.

DETAILED DESCRIPTION OF THE PREFERRED EMBODIMENTS

The brushless d.c. motor shown in a diagrammatic cross-sectional view in FIG. 1 comprises a first motor section 1 with circumferentially alternating radial permanent-magnetically excited north and south pole pieces. The pole pieces 3 form poles of alternate polarity, i.e. north or south poles, on the inner wall 5. Circumferentially adjacent permanent-magnetic pole pieces 3 with alternate directions of polarization each time constitute a pole pair 6. The embodiment shown in FIG. 1 comprises four pole pairs 6. A soft-magnetic short-circuiting ring 7 extends around the permanent-magnetic pole pieces.

The first motor section 1 is rotatable about a stationary second motor section 9. This stationary second motor section 9 comprises radially disposed salient magnetic pole shanks 11. These pole shanks have a width d and are surrounded by exciter coils 15. The pole shanks 11, which can thus be electrically excited and which are often referred to as "pole teeth" in the literature, are soft-magnetically coupled around a motor shaft 16 by means of iron return members.

The pole shanks 11 do not comprise pole shoes near the air gap 17. Instead, the shanks 11 extend with their iron cross-section, with traverses the exciter coils 15, up to the proximity of the magnetic air gap 17, where they are rounded to reduce their cross-section towards the air gap. In the representation of FIG. 1 the pole tips 19 have been rounded with a radius d/2, d being the pole iron width at the coil area 21. This substantially suppresses the fundamental and the first harmonic of the detent torque The width d does not have any significant effect. Therefore, such a brushless d.c. motor is very suitable for driving small domestic appliances and personal care apparatus, such as dry-shavers.

FIG. 2 shows a modified form of a pole tip 19'. In the case of a pole iron width b (b>d) the rounding in the central iron area 23 is now adapted to the arc radius $r_s$ of the air gap 17 and have a small arc radius of, for example, d/2 in the peripheral areas 25.

I claim:

1. A brushless d.c. motor comprising a first motor section, which includes circumferentially alternating permanent-magnetic north and south poles adjacent a magnetic air gap, and comprising a second motor section having electrically energizable salient soft-magnetic pole shanks extending towards the magnetic air gap, characterized in that the soft-magnetic pole shanks extend with their iron cross-section, which traverses exciter coils, up to proximity with the magnetic air gap, said pole shanks having pole tips which are rounded to reduce the cross-section towards the air gap and wherein with a pole iron width d at a location of the coils each rounded pole tip has a radius d/2.

2. A brushless d.c. motor as claimed in claim 1, wherein with a pole iron width b (b>d) at a location of the coils roundings in a central iron area are adapted to an arc radius of the air gap and have a smaller arc radius in peripheral areas.

* * * * *